United States Patent [19]

Jorgensen et al.

[11] Patent Number: 4,714,537

[45] Date of Patent: Dec. 22, 1987

[54] PROCESS FOR CYCLIC DEWAXING/REGENERATION OF HYDROCARBON FEEDSTOCKS

[75] Inventors: Diane V. Jorgensen, Wilmington; Clinton R. Kennedy, Talleyville, both of Del.; Stephen S. Wong, Medford, N.J.

[73] Assignee: Mobil Oil Corporation, New York, N.Y.

[21] Appl. No.: 873,661

[22] Filed: Jun. 11, 1986

Related U.S. Application Data

[63] Continuation-in-part of Ser. No. 709,858, Jun. 8, 1985, abandoned.

[51] Int. Cl.$^4$ ................. C10G 47/02; C10G 23/90
[52] U.S. Cl. ................. 208/111; 208/140
[58] Field of Search ............ 208/140, 111; 502/50, 502/53

[56] References Cited

U.S. PATENT DOCUMENTS

| | | | |
|---|---|---|---|
| 2,906,702 | 9/1959 | Brennan et al. | 208/140 |
| 3,069,362 | 12/1962 | Mays et al. | 502/52 |
| 3,069,363 | 12/1962 | Mays et al. | 502/52 |
| 3,134,732 | 5/1964 | Kearby et al. | 208/140 |
| 3,140,264 | 7/1964 | Oleck et al. | 208/140 |
| 3,197,399 | 7/1965 | Wight et al. | 208/111 |
| 3,357,915 | 12/1967 | Young | 208/111 |
| 3,400,073 | 9/1968 | Schwarzenbek et al. | 208/140 |
| 3,661,768 | 5/1972 | Davis, Jr. et al. | 208/139 |
| 3,986,982 | 10/1976 | Crowson et al. | 502/37 |
| 4,232,181 | 11/1980 | Kiovsky et al. | 585/739 |
| 4,358,395 | 11/1982 | Haag et al. | 585/408 |
| 4,359,400 | 11/1982 | Landolt et al. | 208/140 |
| 4,419,220 | 12/1983 | LaPierre et al. | 208/111 |

FOREIGN PATENT DOCUMENTS 1148545  4/1969  United Kingdom .

OTHER PUBLICATIONS

Bartholomew, Calvin H., "Catalyst Deactivation and Regeneration" Chem. Eng., pp. 96–112, vol. 91, No. 23, Nov. 12, 1984.
Zeolite Chemistry and Catalysis, Rabo, July A. (ed.), American Chemical Society, pp. 552–578 and pp. 607–608, 1976.
"Sintering and Redispersion of Conventional Supported Metal Catalysts in Hydrogen and Oxygen Atmospheres", E. Wanke, Sintering and Heterogeneous Catalysis, Materials Science Research, vol. 16, pp. 223–242, Plenum Press (1984).

Primary Examiner—Curtis R. Davis
Attorney, Agent, or Firm—Alexander J. McKillop; Michael G. Gilman; Malcolm D. Keen

[57] ABSTRACT

A process is described which improves the performance of cyclic dewaxing/regeneration processes using a catalyst comprising palladium and a zeolite having the structure of Zeolite Beta. The cyclic process includes regenerating the catalyst by oxidation alone or combinations of oxidation and reduction to substantially restore catalyst activity.

28 Claims, 1 Drawing Figure

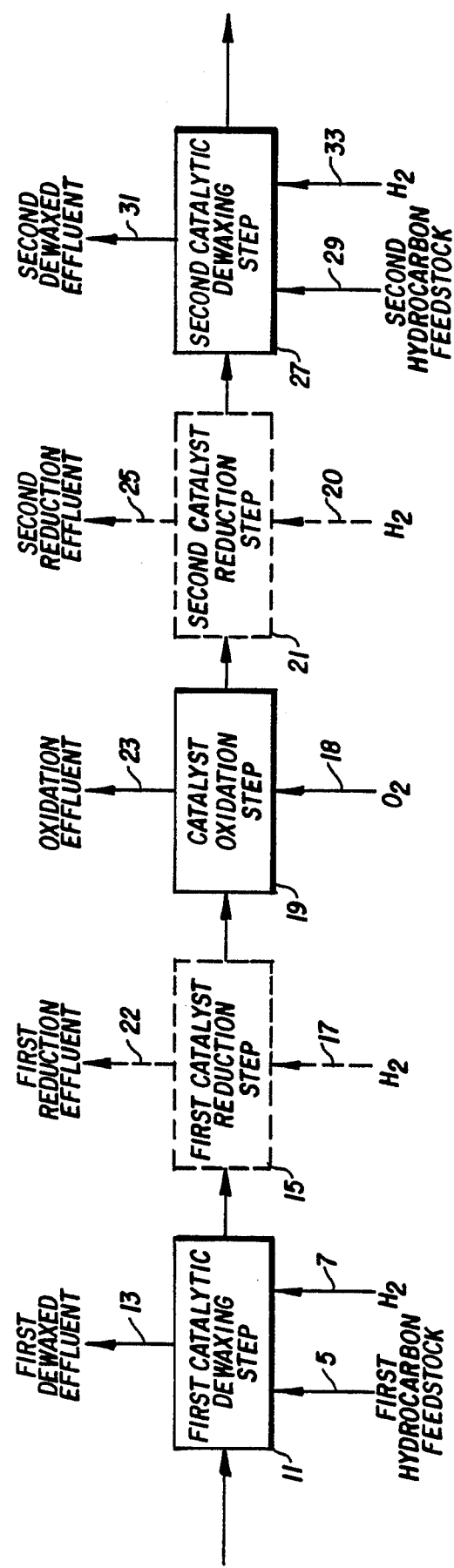

PROCESS FOR CYCLIC DEWAXING/REGENERATION OF HYDROCARBON FEEDSTOCKS

CROSS REFERENCE TO RELATED APPLICATIONS

The present application is a continuation-in-part of parent U.S. patent application Ser. No. 709,858, filed June 8, 1985, now abandoned, and incorporates the contents of this applications by reference.

U.S. patent application Ser. No. 647,594, filed Sept. 6, 1984, and now abandoned, is directed to the preparation of highly dispersed noble metal-containing catalysts.

U.S. patent application Ser. No. 656,297, filed Oct. 1, 1984, and now abandoned, is directed to a process for regenerating noble metal-containing zeolite catalysts.

U.S. patent application Ser. No. 580,925, filed Feb. 16, 1984, and now abandoned, is directed to a method for regenerating noble metal-containing highly siliceous zeolite hydrocarbon conversion catalysts.

U.S. patent application Ser. No. 740,690, filed June 3, 1985, now U.S. Pat. No. 4,615,957, is directed to the preparation of noble metal-containing zeolite catalysts.

U.S. patent applications Ser. Nos. 835,690 and 835,828, filed Mar. 3, 1986, are directed to a noble metal-containing Zeolite Beta with improved stability.

U.S. patent application Ser. No. 624,304, filed June 25, 1984, now U.S. Pat. No. 4,578,181, is directed to highly dispersed catalysts for the hydrothermal conversion of heavy oils and residua.

BACKGROUND OF THE INVENTION

1. Field of the Invention

The invention relates to providing a cyclic dewaxing/regeneration operation for hydrocarbon feedstocks. In particular, it relates to a cyclic process which includes regenerating a catalyst comprising palladium and a zeolite having the structure of Zeolite Beta, which has been deactivated by coke buildup or poisoning. Catalysts which may be employed by the process of the present invention include those deactivated during hydrocarbon hydroprocessing, such as catalytic dewaxing by isomerization of hydrocarbon feedstocks.

2. Discussion of the Prior Art

Catalytic dewaxing of hydrocarbon feedstocks, such as distillate fuel oils and gas oils, by isomerization over a Zeolite Beta catalyst comprising a noble metal of Group VIIIA, such as platinum, palladium, etc. is known in the art. U.S. Pat. No. 4,419,220 to LePierre et al discloses such a process. However, the isomerization catalyst is deactivated by coke buildup or poisoned by materials, such as nitrogen, or heavy metals, such as vanadium. A detailed background on catalysis, catalyst poisons and catalyst regeneration and rejuvenation is provided by "Catalyst Deactivation and Regeneration", Chemical Engineering, Vol. 91, No. 23, pp. 96–111, Nov. 12, 1984. Rejuvenation generally characterizes reactivation processes employing halogen, whereas regeneration generally characterizes reactivation processes not employing halogen.

Isomerization employs a dual function catalyst and, for proper operation, a metal-to-acid (zeolite) balance must be maintained. The dual functions are metal for hydrogenation and zeolite for hydrocarbon isomerization/cracking. Studies on metal sintering on emorphous catalysts indicated palladium catalysts tended to sinter more than platinum catalysts. Continued developments found better techniques for applying palladium while reducing the tendency to sinter.

U.S. Pat. No. 4,232,181 to Kiovsky et al discloses a method of isomerizing pentane utilizing palladium-exchanged Mordenite.

Reactivation of platinum catalysts utilized in hydrocarbon hydroprocessing procedures, such as reforming, is known in the art. Processes which utilize chlorine and oxygen in catalyst reactivation are particularly well known. For example, U.S. Pat. No. 2,906,702 to Brennan et al discloses a method of restoring an alumina-supported platinum catalyst after deactivation caused by the reforming of hydrocarbons. This method teaches contacting a deactivated platinum-alumina catalyst with a gaseous chlorine, fluorine, or other halogen or halogen-affording substance at an elevated temperature.

U.S. Pat. No. 3,134,732 to Kearby et al teaches a method for reactivating a noble metal catalyst supported on alumina by contacting the catalyst with halogen-containing gas, stripping excess halogen therefrom, and subjecting the resulting catalyst to a reduction step with a hydrogen-containing gas. In this disclosure, the agglomerated metal is present on the surface of the alumina as small crystals.

It is also known in the art to reactivate noble metal and platinum group metal-containing zeolite catalysts. Reactivation of noble metal-loaded zeolite catalysts requires certain procedural modifications to regain the activity of the metal. U.S. Pat. No. 3,986,982 to Crowson et al treats deactivated platinum group metal-loaded zeolites by contacting them with a stream of an inert gas containing from 0.5 to 20% volume of free oxygen and from 5 to 500 ppm volume of chlorine as chlorine, HCl, or an organic chlorine-containing material. The resulting catalyst is purged to remove residual oxygen and chlorine, and then reduced in a stream of hydrogen at 200° to 600° C.

The treatment of noble metal-containing catalyst materials with sulfur compounds is also known in the art. For example, U.S. Pat. No. 3,661,768 to Davis, Jr. et al describes a method of reactivating a bimetallic reforming catalyst, such as platinum-rhenium, on alumina, which includes contacting the catalyst with hydrogen sulfide to convert platinum to platinum sulfide. Prior to sulfiding, the catalyst is contacted with chlorine and steam in order to effect chlorination.

U.S. Pat. Nos. 3,069,362 and 3,069,363 to R. L. Mays et al disclose coke removal by oxidative burn-off under controlled conditions of oxygen concentration, temperature and water vapor concentration. However, this method is not effective for dual function catalysts; that is, catalysts which contain an active metal, as noted above, because it deactivates the metal.

British Pat. No. 1,148,545 discloses a process that is effective for decoking a dual function catalyst, comprising heating the catalyst from oxidative burn-off at a temperature of at least 800° F. (427° C.), cooling the catalyst to below 600° F. (316° C.) and partially rehydrating the catalyst, and contacting the partially rehydrated catalyst with hydrogen at a temperature of at least 850° F. (454° C.). However, this involves the hydration and repeated heating and cooling steps, which may cause expansion and contraction of catalyst, and resulting catalyst attrition.

U.S. Pat. No. 4,358,395 to Haag et al discloses zeolite catalyst regeneration in which a zeolite catalyst is contacted with oxygen, then precoked under controlled conditions and then contacted with hydrogen (H₂) gas under controlled conditions. This process has the drawback of requiring the precoking step.

Catalyst regeneration employing oxidation or reduction may be conducted either in situ within a reactor or offsite outside of the reactor. Offsite regeneration may comprise contacting a thin layer of catalyst on a moving belt with the oxidating or reducing gas. There are some benefits to offsite reduction because it allows high temperature throughout of oxygen without danger of temperature runaway. Also, impurities are removed from the catalyst layer without having to contact other catalyst downstream in the same layer, as is the case for in situ regeneration.

All of the above halogen treatment require certain precautions owing to the corrosive nature of the halogens used. In addition, certain halogen materials employed in these processes and significantly to the cost of catalyst reactivation. In order to avoid the drawbacks associated with halogen use, it would be advantageous to reactivate catalysts in the absence of halogens. However, when deactivating coke present on a catalyst material is exposed to an oxidizing atmosphere consisting of oxygen and an inert gas, such as nitrogen, substantially all of the noble metal present on the catalyst then becomes catalytically inactive.

It would be desirable to find a catalyst for catalytic dewaxing by hydroisomerization which can be regenerated by simple oxidation or combinations of oxidation and reduction. This would potentially eliminate or reduce the need for the use of troublesome and corrosive halogen rejuvenation procedures, or oxidation and reduction procedures which incorporate additives or additional steps, such as precoking. This would result in improving and simplifying the performance of cyclic dewaxing/regeneration processes and significantly increase processing time.

SUMMARY OF THE INVENTION

By way of background, it has been known to employ fresh palladium or platinum containing Zeolite Beta in a process for catalytically dewaxing a hydrocarbon feedstock by isomerization to produce lube oil.

The inventors have found that regenerated palladium catalyst performs better than regenerated platinum catalyst. In particular, the inventors have found that catalyst materials comprising palladium and a zeolite having the structure of Zeolite Beta can be reactivated by oxidation, or a combination of oxidation and reduction, without significant loss of the metal function activity therein. The inventors have further found that the redispersion characteristics of a regenerated palladium-Zeolite Beta-containing catalyst are superior to that of a platinum-Zeolite Beta-containing catalyst.

Accordingly, a primary object of the invention is to provide a cyclic process for dewaxing hydrocarbon feed to produce distillate and lube oils by catalytic isomerization employing a regenerated catalyst comprising palladium and a Zeolite having the structure of Zeolite Beta, wherein regeneration is by oxidation or a combination of oxidation and reduction.

Another object of the invention is to provide a cyclic dewaxing and regeneration process employing dewaxing of a hydrocabon feed to produce distillate and lube oils by catalytic isomerization and regeneration by oxidation, or a combination of oxidation and reduction, wherein the catalyst comprises palladium and a zeolite having the structure of Zeolite Beta.

It is still another object of the invention to provide a Zeolite Beta-containing catalyst with improved palladium radispersion efficiency.

The invention relates to a process for catalytically dewaxing a hydrocarbon feedstock comprising straight chain paraffins and slightly branched paraffins comprising the following steps;

contacting the feedstock at isomerization conditions with an oxidized catalyst, comprising palladium and a zeolite having the structure of Zeolite Beta, to produce an effluent stream having a pour point less than that of the feedstock;

wherein the catalyst has been regenerated by an oxidation step comprising contacting the catalyst with a stream consisting essentially of an inert gas and 0.1 to 10 volume % oxygen at a temperature between about 200° and about 540° C., a pressure from atmospheric to 25,000 kPa at a contact time sufficient to restore the activity of the catalyst.

The invention may also comprise a cyclic process for dewaxing a hydrocarbon feedstock comprising straight chain paraffins and slightly branched paraffins, comprising the following steps;

contacting a first stream of the feedstock with a fresh catalyst, comprising palladium in highly dispersed form and a Zeolite having the structure of Zeolite Beta, under isomerization conditions of temperature, pressure, space velocity and hydrogen feed rate to produce a first effluent stream having a pour point less than that of the feedstock;

oxidizing the catalyst by contact with an oxidizing stream consisting essentially of an inert gas and oxygen;

contacting a second stream of the feedstock with the oxidized catalyst at about the same isomerizing conditions of pressure, space velocity and hydrogen treat rate as in the first contacting step, and at a temperature less than 20° F. above that employed in the first contacting step, to produce a second effluent stream having a pour point less than 20° F. above that of the first effluent stream.

More particularly, the invention comprises a cyclic process for dewaxing a hydrocarbon feedstock comprising straight chain paraffins and slightly branched paraffins, comprising the following steps:

contacting a first stream of the feedstock with a fresh catalyst, comprising about 0.1 to about 1.2 wt % palladium and a zeolite having the structure of Zeolite Beta, wherein the zeolite has a silica:alumina ratio greater than 30:1; under isomerization conditions comprising a temperature from 400° to 450° C. (750°–840° F.), a pressure from 2000 to 10,000 kPa (285–1435 psig), a space velocity from 0.2 to 5 LHSV, and a hydrogen feed rate of 2000 to 11,500 SCF/bbl of the first feedstock to produce an effluent stream having a pour point less than that of the feedstock;

reducing the catalyst by contact with a stream, consisting essentially of at least 70 volume % hydrogen, with the remainder being inert gas, at a temperature from 400° to 510° C. (752°–950° F.), at a pressure from atmospheric to 10,000 kPa (1435 psig), and a catalyst contact time of 1 to 24 hours;

oxidizing the reduced catalyst by contact with an oxidizing stream, consisting essentially of an inert gas and 0.3 to 7 volume % oxygen, at a temperature from 350° to 510° C. (660°–950° F.), a pressure from atmospheric to 10,000 kPa (1435 psig), and a catalyst contact time sufficient to oxidize coke adhering to the catalyst to less than 5 wt % of the catalyst;

reducing the oxidized catalyst by contact with a stream, consisting essentially of at least 70 volume % hydrogen, with the remainder being inert gas at a temperature from 200° to 510° C. (392°–950° F.), a pressure from atmospheric to 10,000 kPa (1435 psig), and a catalyst contact time of 1 to 24 hours;

contacting a second stream of the feedstock with the twice reduced catalyst under isomerization conditions, comprising a temperature from 400° to 450° C. (750°–840° F.), a pressure from 2000 to 10,000 kPa (285–1435 psig), a space velocity from 0.2 to 5 LHSV, and a hydrogen feed rate of 2000 to 11,500 SCF/bbl of the second feedstock, and wherein the temperature is less than 20° F. above that employed in the first isomerizing step, to produce a second effluent stream having a pour point less than 10° F. (5° C.) above that of the first effluent stream.

The present invention allows for regeneration of an isomerization catalyst, comprising palladium and a zeolite having the structure of Zeolite Beta, by oxidation alone or combinations of oxidation and reduction, employing oxidizing streams consisting essentially of oxygen and inert gas, or reducing streams consisting essentially of hydrogen, with any remainder being inert gas. Preferably, the inert gas in the oxidizing streams comprises nitrogen. Typically, the reducing stream contains at least 50 volume % hydrogen, or preferably at least 70 volume % hydrogen, with the remainder being inert gas such as nitrogen, carbon monoxide, carbon dioxide or hydrocarbons from fuels processing streams located in a typical refinery. This allows economical cyclic operation, because catalyst may be inexpensively regenerated rather than thrown away, and the regenerated catalyst retains significant isomerization activity. The improved performance of the palladium catalyst under the cyclic operation may significantly increase the processing time in cyclic operations and potentially reduce or eliminate the need for corrosive halogen-rejuvenation procedures.

BRIEF DESCRIPTION OF THE DRAWING

The drawing is a flowchart of the cyclic dewaxing/regeneration process of the present invention.

DESCRIPTION OF THE PREFERRED EMBODIMENTS

The present invention relates to a cyclic process employing a catalyst, comprising palladium and a zeolite having the structure of Zeolite Beta. The cyclic process includes the steps of catalytically dewaxing a hydrocarbon feedstock by isomerization and regenerating the catalyst by oxidation, or a combination of oxidation and reduction, to provide a catalyst of enhanced activity which retains a substantial portion of its palladium in a dispersed form. During oxidation, coke and poisons on the catalyst material are contacted with oxygen under suitable oxidizing conditions. Optionally, the catalyst material may be reduced by contact with hydrogen under suitable reducing conditions before and/or after oxidation.

The cyclic process employs a catalyst comprising a zeolite having the structure of Zeolite Beta having a silica; alumina ratio of at least about 30:1, and containing about 0.01 to about 5.0 wt % palladium. Preferably, the catalyst comprises about 0.1 to about 1.2 wt % palladium. The catalyst and cyclic process are described in more detail below.

The palladium-containing catalyst, which can be regenerated by the regeneration process described below, is incorporated into a cyclic dewaxing, regeneration process, as shown by the sole figure attached. Preferably, the dewaxing occurs under isomerization conditions. These conditions include a temperature from 200° to 540° C. (392° to 1004° F.), a pressure from atmospheric to 25,000 kPa (3600 psig), and a space velocity from 0.1 to 20 LHSV. The hydrogen feed rate is generally 1000 to 22,500 SCF/bbl of feedstock. Preferably, the isomerization conditions include a temperature from 400° to 450° C. (750° to 840° F.), a pressure from 2000 to 10,000 kPa (285 to 1435 psig), a space velocity from 0.2 to 5 LHSV, and a hydrogen feed rate from 2000 to 11,500 SCF/bbl. Isomerization is described in more detail by U.S. Pat. No. 4,419,220 to La Pierre et al.

Prior to dewaxing, the feedstock may be subjected to a preliminary hydrotreating step (not shown) to remove nitrogen and sulfur and to saturate aromatics to naphthenes without substantial boiling range conversion. The hydrotreating step will usually improve catalyst performance and permit lower temperatures, higher space velocities, lower pressures, or combinations of these conditions, to be employed.

Thus, as shown in the sole figure, the cyclic dewaxing and regeneration process would include catalytically dewaxing a first stream of hydrocarbon feedstock 5 comprising n-paraffins (straight chain paraffins) and slightly branched paraffins in a first catalyst dewaxing step 11, by contact with the catalyst under the isomerization conditions described above to produce a first dewaxed effluent stream 13 having a pour point less than that of the feedstock. Typically, the pour point of the effluent 13 is less than 30° F. (−1° C.), although it may be higher if desired. The isomerization continues until the catalyst is substantially deactivated. Deactivation has taken place when the catalyst cannot produce an effluent having the desired pour point at the above-described isomerization conditions.

The deactivated catalyst is then regenerated by a catalyst oxidation step 19, in which the catalyst contacts with oxygen from an oxidizing stream 18 to produce an oxidation effluent 23. Preferably, the regeneration also includes optional first and second catalyst reduction steps 15, 21, which are before and after oxidation to produce first and second reduction effluents 22, 25 respectively. In first step 15, the deactivated catalyst contacts with hydrogen from a stream 17. In second step 21, the oxidized catalyst contacts with hydrogen from a stream 20. Another desirable regeneration scheme would include the oxidation step 19 and the second reduction step 21 but omitting the first reduction step 15. Suitable conditions for oxidation and reduction are provided below.

The deactivated catalyst material is treated to burn off deactivating coke materials and poisons by the catalyst oxidation step 19 under controlled oxidizing conditions of temperature, pressure, residence time and oxygen concentration. Suitable oxidizing conditions include temperatures ranging from 200° to 540° C. (392° to 1004° F.), preferably 350° to 510° C. (660° to 950° F.), and pressures ranging from atmospheric to 25,000 kPa (3600 psig), preferably atmospheric to 10,000 kPa (1435 psig). The oxidizing agent is a gas and its feed rate may range from 70 to 610 standard liters per hour per pound catalyst, preferably 100 to 340 standard liters per hour per pound catalyst. The standard conditions are 1 atmosphere and 60° F. It is preferred that the oxidizing conditions be mild enough to prevent any alteration in the crystal structure of the zeolite being treated. The deactivated catalyst material is contacted with a gas stream consisting essentially of an inert gas and oxygen. Generally, the oxidizing stream 18 may contain about 0.1 to about 10, preferably 0.3 to 7 volume % oxygen. The inert gas is typically nitrogen. The control of oxygen concentration maintains temperature within the desired range, as mentioned above, and prevents or reduces agglomeration of the noble metals dispersed throughout the catalyst during the removal of coke from the zeolite catalyst material. To determine when oxidization is completed, the oxidation effluent gas 23 is measured by a gas analyzer, such as a gas chromatograph, for $O_2$ concentration and/or $CO/CO_2$ evolution. Oxidation is completed when the $O_2$ concentration prior to contacting catalyst equals the $O_2$ concentration after contacting the catalyst. Oxidation is also complete when carbon monoxide concentration is negligible due to the absence of combustion.

Dispersion of the noble metals can be measured by hydrogen chemisorption, e.g., Temperature Programmed Desorption (TPD), of hydrogen. This technique indicates the extent of noble metal agglomeration of a catalyst material. Details of this analytical technique may be found in "The Stoichiometry of Hydrogen and CO Chemisorption of Ir/y-$Al_2O_3$". Vol. 78, *Journal of Catalysis,* pages 319-326, Krishnamurthy et al (1982).

The reducing procedure which may optionally precede and/or follow removal of the coke and poisons by oxidation from the catalyst material utilizes a reducing agent which consists essentially of hydrogen, with any remainder being an inert gas. Suitable inert gases include nitrogen, carbon monoxide, carbon dioxide, or hydrocarbons from fuels processing streams located in a typical refinery. Reduction of the catalyst material in the first reduction step 15 is achieved by contacting it with the reducing agent from stream 17 under suitable reducing conditions. These conditions include temperatures ranging from 200° to 540° C. (392° to 1004° F.), preferably 400° to 510° C. (752° to 950° F.), and contact times ranging from about 0.5 to 48 hours, preferably 1 to 24 hours. The reduction is carried out at pressures ranging from about atmospheric to 25,000 kPa (3600 psig), preferably about atmospheric to 10,000 kPa (1435 psig). The reducing agent feed rate may range from 70 to 610 standard liters per hour per pound catalyst, preferably 100 to 340 standard liters per hour per pound catalyst. The standard conditions are 1 atmosphere and 60° F. Hydrogen may be taken from any hydrogen stream in a refinery, such as recycle streams or streams from a steam reformer. Typically, the refinery streams will have a hydrogen concentration of greater than 50 volume %, with the remainder being inert gas. Preferably, the reducing agent forms a stream containing greater than 70 volume % hydrogen ($H_2$), with the remainder being inert gas.

Reduction of the oxidized catalyst material in a second reduction step 21 is achieved by contacting it with the reducing agent from stream 20 under suitable reducing conditions. These include temperatures ranging from 200° to 540° C. (392°-1004° F.), preferably 200° to 510° C. (392°-950° F). The other reducing conditions have the same ranges as the first reduction step 15.

There is typically a conventional purge of inert gas, such as nitrogen, between the oxidation and reduction steps. The purge is usually at a pressure ranging from atmospheric to about 25,000 kPa and a temperature from 200° to 540° C.

The regenerated catalyst is then employed for catalytically dewaxing a second stream of the hydrocarbon feedstock 29, comprising n-paraffins (straight chain paraffins) and slightly branched paraffins in a second catalytic dewaxing step 27, by contact with the regenerated catalyst under the range of isomerization conditions of pressure, hydrogen feed rate and space velocity, as in the first dewaxing (isomerizing) step 11. Hydrogen is provided by a hydrogen stream 33. However, the temperature employed is less than 20° F. above that employed in the first dewaxing step 11. At these conditions, the second dewaxing step 27 may produce a second dewaxed effluent stream 31 having a pour point less than 20° F. (11° C.) above that of the first effluent stream. Preferably, the second dewaxed effluent stream 31 has a pour point less than 10° F. (6° C.) above that of the first effluent stream.

FEEDSTOCK

The present process may be used to dewax a variety of feedstocks ranging from relatively light distillate fractions up to high boiling stocks, such as whole crude petroleum, reduced crudes, vacuum tower residua, cycle oils, FCC tower bottoms, gas oils, vacuum gas oils, deasphalted residua and other heavy oils. The feedstock will normally be a $C_{10}{}^+$ feedstock, since lighter oils will usually be free of significant quantities of waxy components. However, the process is particularly useful with waxy distillate stocks, such as gas oils, kerosenes, jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.). Hydrocracked stocks are a conveninet source of stocks of this kind and also of other distillate fractions, since they normally contain significant amounts of waxy n-paraffins which have been produced by the removal of polycyclic aromatics.

The feedstock for the present process will normally be a $C_{10}{}^+$ feedstock containing paraffins, olefins, naphthenes, aromatics and heterocyclic compounds, and with a substantial proportion of higher molecular weight straight chain paraffins (n-paraffins) and slightly branched paraffins which contribute to the waxy nature of the feedstock. During the processing, the n-paraffins become isomerized to iso-paraffins and the slightly branched paraffins undergo isomerization to more highly branched aliphatics. At the same time, a measure of cracking does take place so that not only is the pour point reduced by reason of the isomerization of n-paraffins to the less waxy branched chain iso-paraffins but, in addition, the heavy ends undergo some cracking or hydrocracking to form liquid range materials which contribute to a low viscosity product. The degree of cracking which occurs is, however, limited so that the gas yield is reduced, thereby preserving the economic value of the feedstock.

Typical feedstocks include light gas oils, heavy gas oils and reduced crudes boiling above 150° C.

It is a particular advantage of the present process that the isomerization proceeds readily, even in the presence of significant proportions of aromatics in the feedstock, and, for this reason, feedstocks containing aromatics, e.g., 10% or more aromatics, may be successfully dewaxed. The aromatic content of the feedstock will depend, of course, upon the nature of the crude employed and upon any preceding processing steps, such as hydrocracking, which may have acted to alter the original proportion of aromatics in the oil. The aromatic content will normally not exceed 50 wt % of the feedstock, and more usually will be not more than 10 to 30 wt %, with the remainder consisting of paraffins, olefins, naphthenes and heterocyclics. The paraffins content (normal and iso-paraffins) will generally be at least 20 wt %, more usually at least 50 or 60 wt %. Certain feedstocks, such as jet fuel stocks, may contain as little as 5% paraffins.

CATALYST

The catalyst used in the process comprises a zeolite having the structure of Zeolite Beta with a hydrogenating/ dehydrogenating component of palladium. Zeolite Beta is a known zeolite, which is described in U.S. Pat. No. 3,308,069 and U.S. Pat. No. Re. 28,341, to which reference is made for further details of this Zeolite, its preparation and properties. The composition of Zeolite Beta in its as-synthesized form is as follows; on an anhydrous basis:

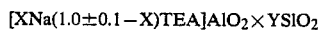

[XNa(1.0±0.1−X)TEA]AlO₂×YSiO₂ where X is less than 1, preferably less than 0.75; TEA represents the tetraethylammonium ion; Y is greater than 5 but less than 100. In the as-synthesized form, water of hydration may also be present in ranging amounts.

The sodium is derived from the synthesis mixture used to prepare the zeolite. This synthesis mixture contains a mixture of the oxides (or of materials whose chemical compositions can be completely represented as mixtures of the oxides) Na₂O, Al₂O₃, [(C₂H₅)₄N]₂O, SiO₂ and H₂O. The mixture is held at a temperature of about 75° to 200° C. until crystallization occurs. The composition of the reaction mixture, expressed in terms of mole ratios, preferably falls within the following ranges:

SiO₂/Al₂O₃—10 to 200
Na₂O/tetraethylammonium hydroxide (TEAOH-)—0.0 to 0.1
TEAOH/SiO₂—0.1 to 1.0
H₂O/TEAOH—20 to 75

The product which crystallizes from the hot reaction mixture is separated, suitably by centrifuging or filtration, washed with water and dried. The material so obtained may be calcined by heating in air or an inert atmosphere at a temperature usually within the range 200° to 900° C. or higher. This calcination degrades the tetraethylammonium ions to hydrogen ions and removes the water, so that N in the formula above becomes zero or substantially so. The formula of the zeolite is then:

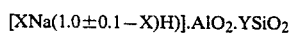

[XNa(1.0±0.1−X)H)].AlO₂.YSiO₂ where X and Y have the values ascribed to them above. The degree of hydration is here assumed to be zero, following the calcination.

If this H-form zeolite is subjected to base exchange, the sodium may be replaced by another cation to give a zeolite of the formula (anhydrous basis):

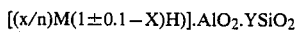

[(x/n)M(1±0.1−X)H)].AlO₂.YSiO₂ where X, Y have the values ascribed to them above and n is the valence of the metal M, which may be any metal, but is preferably a metal of Groups IA, IIA or IIIA of the Periodic Table, or a transition metal (the Periodic Table referred to in its specification is the Table approved by IUPAC and the U.S. National Bureau of Standards shown, for example, in the Table of Fisher Scientific Company, Catalog No. 5-702-10).

The as-synthesized sodium form the zeolite may be subjected to base exchange directly without intermediate calcination to give a material of the formula (anhydrous basis):

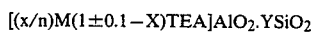

[(x/n)M(1±0.1−X)TEA]AlO₂.YSiO₂ where X, Y, n and m are as described above. This form of the zeolite may then be converted partly to the hydrogen form by calcination, e.g., at 200° C. to 900° C. or higher. The completely hydrogen form may be made by ammonium-exchange, followed by calcination in air or an inert atmosphere such as nitrogen. Base exchange may be carried out in the manner disclosed in U.S. Pat. No. 3,308,069 and U.S. Pat. No. Re. 28,341.

Because tetraethylammonium hydroxide is used in its preparation, Zeolite Beta may contain occluded tetraethylammonium ions (e.g., as the hydroxide or silicate) within its pores, in addition to that required by electroneutrality and indicated in the calculated formula given in this specification. The formulae, of course, are calculated using one equivalent of cation is required per Al atom in tetrahedral coordination in the crystal lattice.

Zeolite Beta, in addition to possessing a composition as defined above, may also be characterized by its X-ray diffraction data, which are set out in U.S. Pat. No. 3,308,069 and U.S. Pat. No. Re. 28,341. The significant d values (Angstroms, radiation: K alpha doublet of copper, Geiger counter spectrometer) are shown in Table 1 below:

TABLE 1

| d Values of Reflections in Zeolite Beta |
|---|
| 11.40 + 0.2 |
| 7.40 + 0.2 |
| 6.70 + 0.2 |
| 4.25 + 0.1 |
| 3.97 + 0.1 |
| 3.00 + 0.01 |
| 2.20 + 0.1 |

The preferred forms of Zeolite Beta for use in the present process are the high silica forms having a silica:alumina ratio of at least 30:1. It has been found, in fact, that Zeolite Beta may be prepared with silica:alumina ratios above the maximum specified in U.S. Pat. No. 3,308,069 and U.S. Pat. No. Re. 28,341, and these forms of the zeolite provide the best performance in the present process. Ratios of at least 50:1, and preferably at least 100:1 or even higher, e.g., 250:1, 500:1, may be used in order to maximize the isomerization reactions at the expense of the cracking reactions.

The silica:alumina ratios referred to in this specification are the structural or framework ratios, that is, the ratio of the SiO₄ to the AlO₄ tetrahedra, which together constitute the structure of which the zeolite is composed. It should be understood that this ratio may vary from the silica:alumina ratio determined by various physical and chemical methods. For example, a gross chemical analysis may include aluminum which is present in the form of cations associated with the acidic sites present in the form of cations associated with the acidic sites on the zeolite, thereby giving a low silica:alumina ratio. Similarly, if the ratio is determined by the TGA/NH$_3$ adsorption method, a low ammonia titration may be obtained if cationic aluminum prevents exchange of the ammonium ions onto the acidic sites. These disparities are particularly troublesome when certain treatments, such as the dealuminiation method described below which results in the presence of ionic aluminum free of the zeolite structure, are employed. Due care should therefore be taken to ensure that the framework silica:alumina ratio is correctly determined.

The silica:alumina ratio of the zeolite may be determined by the nature of the starting materials used in its preparation and their quantities relative one to another. Some variation in the ratio may therefore be obtained by changing the relative concentration of the silica precursor relative to the alumina precursor, but definite limits in the maximum obtainable silica:alumina ratio of the zeolite may be observed. For Zeolite Beta, this limit is about 200:1, and for ratios above this value, other methods are usually necessary for preparing the desired high silica zeolite. One such method comprises dealumination by extraction with acid, and this method is disclosed in detail in U.S. Patent Application Ser. No. 379,399, filed May 18, 1983 by R. B. LaPierre and S. S. Wong, entitled "High Silica Zeolite Beta", and reference is made to this application for details of the method.

Briefly, the method comprises contacting the zeolite with an acid, preferably a mineral acid such as hydrochloric acid. The dealuminization proceeds readily at ambient and mildly elevated temperatures, and occurs with minimal losses in crystallinity to form high silica forms of Zeolite Beta with silica: alumina ratios of at least 100:1, with ratios of 250:1 or even higher being readily attainable.

The zeolite is conveniently used in the hydrogen form for the dealuminization process, although other cationic forms may also be employed, for example, the sodium form. If these other forms are used, sufficient acid should be employed to allow for the replacement by protons of the original cations in the zeolite. The amount of zeolite in the zeolite/acid mixture should generally be from 5 to 60 wt %.

The acid may be a mineral acid, i.e., an inorganic acid or an organic acid. Typical inorganic acids which can be employed include mineral acids, such as hydrochloric, sulfuric, nitric and phosphoric acids, peroxydisulfonic acid, dithionic acid, sulfamic acid, peroxymonosulfuric acid, amidodisulfonic acid, nitrosulfonic acid, chlorosulfuric acid, pyrosulfuric acid, and nitrous acid. Representative organic acids which may be used include formic acid, trichloroacetic acid, and trifluoroacetic acid.

The concentration of added acid should be such as not to lower the pH of the reaction mixture to an undesirably low level, which could affect the crystallinity of the zeolite undergoing treatment. The acidity which the zeolite can tolerate will depend, at least in part, upon the silica/alumina ratio of the starting material. Generally, it has been found that Zeolite Beta can withstand concentrated acid without undue loss in crystallinity but, as a general guide, the acid will be from 0.1 N to 4.0 N, usually 1 to 2 N. These values hold good regardless of the silica:alumina ratio of the Zeolite Beta starting material. Stronger acids tend to effect a relatively greater degree of aluminum removal than weaker acids.

The dealuminization reaction proceeds readily at ambient temperatures, but mildly elevated temperatures may be employed, e.g., up to 100° C. The duration of the extraction will affect the silica:alumina ratio of the product, since extraction is time dependent. However, because the zeolite becomes progressively more resistant to loss of crystallinity as the silica: alumina ratio increases, i.e., it becomes more stable at the aluminum is removed, higher temperatures and more concentrated acids may be used towards the end of the treatment than at the beginning without the attendant risk of losing crystallinity.

After the extraction treatment, the product is water washed free of impurities, preferably with distilled water, until the effluent wash water has a pH within the approximate range of 5 to 8.

The crystalline dealuminized products obtained by the method of this invention have substantially the same crystallographic structure as that of the starting aluminosilicate zeolite, but with increased silica:alumina ratios. The formula of the dealuminized Zeolite Beta will therefore be, on an anhydrous basis:

$$[(x/n)M(1\pm 0.1-X]AlO_2 \cdot YsiO_2$$

where X is less than 1, preferably less than 0.75, Y is at least 100, preferably at least 150, and M is a metal, preferably a transition metal or a metal of Groups IA, 2A or 3A, or a mixture of metals. The silica:alumina ratio, will generally be in the range of 100:1 to 500:1, more usually 150:1 to 300:1, e.g., 200:1 or more. The X-ray diffraction pattern of the dealuminized zeolite will be substantially the same as that of the original zeolite, as set out in Table 1 above. Water of hydration may also be present in varying amounts.

If desired, the zeolite may be steamed prior to acid extraction so as to increase the silica:alumina ratio and render the zeolite more stable to the acid. The steaming may also serve to increase the ease with which the aluminum is removed and to promote the retention of crystallinity during the extraction procedure.

The zeolite is associated with a hydrogenation-dehydrogenation component, regardless of whether hydrogen is added during the isomerization process, since the isomerization is believed to proceed by dehydrogenation through an olefinic intermediate, which is then hydrogenated to the isomerized product, both these steps being catalyzed by the hydrogenation/dehydrogenation component. The hydrogenation/dehydrogenation component is palladium.

The palladium may be incorporated into the catalyst by any suitable method, such as impregnation or exchange onto the zeolite. The palladium may be incorporated in the form of a cationic, anionic or neutral complex, such as $Pd(NH_3)_4^{2+}$, and cationic complexes of this type will be found convenient for exchanging metals onto the zeolite.

The amount of the palladium component is suitable from 0.01 to 5 wt %, normally 0.1 to 1.2 wt %.

It may be desirable to incorporate the catalyst in another material resistant to the temperature and other conditions employed in the process. Such matrix materials include synthetic or natural substances as well as inorganic materials, such as clay, silica and/or metal oxides. The latter may be either naturally occuring or in the form of gelatinous precipitates or else including mixtures of silica and metal oxides. Naturally occurring clays which can be composited with the catalyst include those of the montmorillonite and kaolin families. These clays can be used in the raw state as originally mined or initially subjected to calcination, acid treatment or chemical modification.

The catalyst may be composited with a porous matrix material, such as alumina, silica-alumina, silica-magnesia, silica-zirconia, silica-thoria, silica-berylia, silica-titania, as well as ternary compositions, such as silica-alumina-thoria, silica-alumina-zirconia, silica-alumina-magnesia, and silica-magnesia-zirconia. The matrix may be in the form of a cogel with the zeolite. The relative proportion of zeolite component and inorganic oxide gel matrix may vary widely, with the zeolite content ranging from between 1 to 99 wt %, more usually 5 to 80 wt %, of the composite. The matrix may itself possess catalytic properties, generally of an acidic nature.

The process of the present invention provides a Zeolite Beta-containing catalyst containing palladium in a highly dispersed form. The dispersion of the metal associated with the catalyst can be identified by X-ray diffraction techniques known to the art. Using X-ray diffraction techniques, the area under an X-ray diffraction peak can be related to the size of the aggregates of the metal on the Zeolite Beta. From this, one can calculate the dispersion of the metal on the Zeolite Beta. A large area under the X-ray diffraction peak corresponds to a more agglomerated metal on the Zeolite Beta-containing catalyst. Thus, by measuring the X-ray diffraction peaks associated with different metals and comparing the areas below each peak, one can differentiate or measure the differences in the state of dispersion for each metal.

A comparison of X-ray diffractions between fresh and regenerated palladium-Zeolite Beta-containing catalyst of the present invention and fresh and regenerated platinum-Zeolite Beta-containing catalysts show that the area under the regenerated platinum-Zeolite Beta catalyst is two to three times greater than the area under the regenerated palladium-Zeolite Beta catalyst indicating that the metal dispersion state of the palladium-Zeolite Beta-containing catalyst is greater than that of the platinum-Zeolite Beta-containing catalyst. Therefore, the regeneration of a palladium-Zeolite Beta-containing catalyst according to the present invention results in a catalyst with a higher rate of metal dispersion than the regeneration of a platinum-Zeolite Beta-containing catalyst.

This invention will be better understood by reference to the following examples.

EXAMPLE 1

This example is designed to show the results of regenerating a platinum Zeolite Beta catalyst. 90 grams of a catalyst material of Zeolite Beta, comprising about 50 wt % alumina, about 50 wt % Zeolite Beta, and about 0.6 wt % platinum, was employed for this example. The catalyst was prepared by binding 50 wt % Zeolite Beta and 50 wt % alumina with water. This was then extruded to 1/16" outside diameter and dried at 250° F. in nitrogen. Then, the catalyst was heated at 5° F./min in nitrogen and calcined in nitrogen for 3 hours at 1000° F., then calcined in air for 3 hours at 1000° F. The air-calcined catalyst was steamed for 72 hours at 1025° F. by contact with a stream of 90% steam and 10% air. The steamed catalyst was ammonium-exchanged twice at room temperature with 1 normal $NH_4NO_3$, washed with water and dried at 250° F. overnight. Then, the catalyst was exchanged for 5 hours at room temperature with $Pt(NH_3)_4Cl_2$, at a concentration of 5 milliters water per gram platinum salt with stirring. The catalyst was then washed until free of chlorine. The chlorine level was measured by putting the wash water through a gas chromatograph. The washed catalyst was then dried at 250° F. and calcined in air for 3 hours at 660° F. in 5 volumes/volume/minute air.

The resulting Zeolite Beta catalyst had an alpha value of 50. The significance of the alpha value and a method for determining it are described in U.S. Pat. No. 4,016,218 and *J. Catalysis*, Vol. VI, 278–287 (1966), to which reference is made for details. Typically, catalysts having an alpha value ranging from 10 to 100, or preferably 30 to 70, are employed for isomerization.

The feedstock had the properties listed in Table 2, as provided below:

TABLE 2

| Gas Oil | |
|---|---|
| Carbon, Wt % | 86 |
| Hydrogen, Wt % | 14 |
| Nitrogen, ppm | 200 |
| Basic Nitrogen, ppm | 88 |
| Sulfur | .07 |
| API° Gravity | 35.7 |
| Molecular Weight | 290 |
| Pour Point, °F. | 95 |
| Cloud Point, °F. | 120 |
| KV at 100° C. | 2.6 |
| Paraffins, Wt % | 51–56 |
| Naphthenes, Wt % | 22–26 |
| Aromatics, Wt % | 17–27 |
| Boiling Point (Wt %) | °F. |
| 5 | 519 |
| 10 | 560 |
| 50 | 695 |
| 90 | 807 |
| CCR (Conradson Carbon Residue) | 0.04 |

The hydrocarbon feedstock of Table 2 was contacted with the platinum-Zeolite Beta catalyst, at isomerization conditions, for over 10 days in a ⅜" inside diameter test reactor, to simulate the first catalytic dewaxing step 11 of the figure. The isomerization conditions included a pressure of 400 psig (2850 kPa), a space velocity of 1 LHSV, a hydrogen feed rate of 2000 SCF/bbl of feedstock (15.07 gm-mole $H_2$/liter of feedstock), and a line-out temperature range of 750° to 850° F. (400°–455° C.). The line-out temperature is the first temperature after start up, at which the temperature remains relatively constant for about 3 days. The isomerization conditions resulted in a test reactor product having a pour point of 10° F. (−12° C.) for the total liquid product and a pour point of 20° F. (−7° C.) for the portion of total liquid product having a boiling point (b.p.) above 330° F., as shown by Table 3.

TABLE 3

| Test Results With Platinum/Zeolite Beta | | |
|---|---|---|
| | First Isomerization | Second Isomerization |
| Line-Out Temperature, °F. | Base | Base + 30 |
| Pour Point, °F. | | |
| Total Liquid Product | 10 | 40 |

TABLE 3-continued

Test Results With Platinum/Zeolite Beta

|  | First Isomerization | Second Isomerization |
|---|---|---|
| 330° F. b.p.+ | 20 | 50 |

Then, the catalyst was removed from the test reactor and regenerated in a furnace, under conditions as shown by Table 4. Regeneration was done in a furnace to provide better control than if done in situ. The regeneration included oxidation to simulate the catalyst oxidation step 19 of the figure. Oxidation was at a total pressure of 1 atm. Oxygen gas concentration was varied, as shown by Table 4. Water was added during oxidation to better simulate in situ regeneration, wherein the catalyst typically contains water. Water concentration was provided to fix the partial pressure of water at 72 torr. Afterwards, the oxidized catalyst was purged with nitrogen and then reduced by contact with 100% hydrogen ($H_2$) at a total pressure of 400 psig (2850 kPa) in the furnace, under conditions shown by Table 4, to simulate the second catalyst reduction step 21 of the figure.

TABLE 4

| Process | T (°F.) | Gas Concentration | Time (hrs) |
|---|---|---|---|
| Oxidation | 700 | 0.5 vol. % $O_2$ | 19.5 |
|  | 852 | 0.5 | 4.5 |
|  | 850 | 1.0 | 16.0 |
|  | 850 | 1.0 | 3.5 |
|  | 850 | 5.0 | 4.5 |
|  | 850 | 10.0 | 18.0 |
| Reduction | 850 | 100.0 vol. % $H_2$ | 1.3 |

A second stream of the hydrocarbon feedstock of Table 2 was contacted with 30 cubic centimeters of the regenerated platinum-Zeolite Beta catalyst, at isomerization conditions in the same test reactor, to simulate the second catalytic dewaxing step 27 of the figure. The isomerization conditions included a pressure of 400 psig (2850 kPa), a space velocity of 1 LHSV, a hydrogen feed rate of 2000 SCF/bbl of feedstock (15.07 gm-mole $H_2$/liter of feedstock), and a line-out temperature about 30° F. (17° C.) higher than the previous dewaxing step. The test reactor product had a 40° F. (4° C.) pour point for the total liquid product (TLP), and a pour point of 50° F. (10° C.) for the portion of the total liquid product having a boiling point (b.p.) above 330° F. (166° C.), as shown by Table 3.

EXAMPLE 2

Example 2 shows the improved regenerability of a palladium-Zeolite Beta catalyst, as opposed to the platinum-Zeolite Beta catalyst of Example 1. 90 grams of a catalyst material, comprising about 35 wt % alumina, about 65 wt % Zeolite Beta, and about 0.6 wt % palladium, was employed for this example. The catalyst was prepared by binding 65 wt % Zeolite Beta and 35% alumina with water. The catalyst prepared for Example 2 has a lower alumina:Zeolite Beta ratio than that of Example 1. However, this does not affect regenerability. Regenerability is dependent upon the metal chosen for the catalyst hydrogenation component. The alumina-Zeolite Beta mixture was then extruded to 1/16" outside diameter and dried at 250° F. in nitrogen. Then, the catalyst was heated up at 5° F./min in nitrogen and calcined in nitrogen for 3 hours at 1000° F., then calcined in air for 3 hours at 1000° F. The air-calcined catalyst was steamed for 72 hours at 1025° F. by contact with a stream of 90% steam and 10% air. The steamed catalyst was ammonium-exchanged twice at room temperature with 1 normal $NH_4NO_3$, washed with water and dried at 250° F. overnight. Then, the catalyst was exchanged for 5 hours at room temperature with $pd(NH_3)_4(NO_3)_2$ at a concentration of 5 milliliters water per gram-palladium salt-with stirring. The catalyst was then washed twice and then dried at 250° F. and calcined in air for 3 hours at 660° F. in 5 volume/volume/minute air. The resulting catalyst has an alpha value of 50.

The hydrocarbon feedstock of Table 2 was contacted with the palladium-Zeolite Beta catalyst at isomerization conditions for 16 days, in the same test reactor as Example 1, to simulate the first catalytic dewaxing step 11 of the figure. The isomerization conditions included a pressure of 400 psig (2850 kPa), a space velocity of 1 LHSV, a hydrogen feed rate of 2000 SCF/bbl of feedstock (15.07 gm-mole $H_2$/liter of feedstock), and a line-out temperature in the range of 750° to 850° F. (400°–455° C.). The isomerization conditions resulted in a test reactor product having a pour point of 10° F. (−12° C.) for the total liquid product, and a pour point of 15° F. (−10° C.) for the portion of total liquid product having a boiling point (b.p.) above 330° F., as shown by Table 5.

TABLE 5

Test Results With Palladium/Zeolite Beta

|  | First Isomerization | Second Isomerization |
|---|---|---|
| Line-Out Temperature, °F. | Base | Base + 10 |
| Pour Point, °F. |  |  |
| Total Liquid Product | 10 | 15 |
| 330° F. b.p.+ | 15 | 20 |

The catalyst was then regenerated, as in Example 1 and shown by Table 4, by oxidation followed by reduction to simulate the catalyst oxidation step 19 and the second catalyst reduction step 21 of the figure.

Another stream of the feedstock of Table 2, which represents stream 29 of the figure, was contacted with 30 cubic centimeters of the regenerated palladium-Zeolite Beta catalyst, at isomerization conditions to simulate the second catalytic dewaxing step 27, in the same test reactor as in the prior isomerization step. The isomerization conditions included a pressure of 400 psig (2850 kPa), a space velocity of 1 LHSV, a hydrogen feed rate of 2000 SCF/bbl of feedstock (15.07 gm-mole $H_2$/liter of feedstock) and a line-out temperature of about 10° F. greater than the previous dewaxing cycle. At these conditions, the test reactor product had a 15° F. (−10° C.) pour point for the total liquid product and a 20° F. (−7° C.) pour point for the portion of the total liquid product having a boiling point (b.p.) above 330° F. (166° C.), as shown by Table 5.

Table 6 compares the results of Examples 1 and 2 and shows the superior performance of the Zeolite Beta-palladium catalyst under the cyclic dewaxing/regenerating process. The results particularly show the superior performance as a lower temperature requirement to produce lower pour point products, when the dewaxing is by isomerization and the regenerating is by oxidation followed by reduction. The improved performance of the palladium catalyst under the cyclic operation may significantly increase the processing time in cyclic operations and potentially reduce or eliminate the need for corrosive halogen-rejuvenation procedures.

TABLE 6

Comparison of Second Isomerization Results

| | 1<br>Platinum/<br>Zeolite Beta | 2<br>Palladium/<br>Zeolite Beta | 2-1<br>Difference |
|---|---|---|---|
| Line-Out Temperature, °F. | Base + 30 | Base + 10 | −20 |
| Pour Point, °F. | | | |
| Total Liquid Product | 40 | 15 | −25 |
| 330° F. b.p.+ | 50 | 20 | −30 |

While specific embodiments of the method and apparatus aspects of the invention have been shown and described, it should be apparent that the many modifications can be made thereto without departing from the spirit and scope of the invention. Accordingly, the invention is not limited by the foregoing description, but is only limited by the scope of the claims appended thereto.

We claim:

1. A process for catalytically dewaxing a hydrocarbon feedstock comprising straight chain paraffins and slightly branched paraffins, comprising the following steps:
    contacting said feedstock at isomerization conditions with a regenerated catalyst having isomerization activity and comprising a highly dispersed palladium-containing crystalline-silicate zeolite having the structure of Zeolite Beta to produce an effluent stream having a pour point less than that of said feedstock;
    wherein said catalyst has been regenerated by an oxidation step comprising contacting said catalyst with an oxidizing stream consisting essentially of inert gas and 0.1 to 10 volume % oxygen, at a temperature between about 200° and about 540° C. and a pressure from atmospheric to 25,000 kPa at a contact time sufficient to substantially restore said isomerization activity of said catalyst.

2. The process of claim 1, wherein said oxidation step occurs under a temperature from 350° to 510° C., a pressure from atmospheric to 10,000 kPa, a catalyst contact time sufficient to oxidize coke to less than 5 wt % of said catalyst, and said oxidizing stream consists essentially of inert gas and 0.3 to 7 volume % oxygen.

3. The process of claim 1, further comprising reducing said oxidized catalyst, prior to said isomerization step, by contacting said catalyst with a reducing stream consisting essentially of at least 50 volume % hydrogen, with the remainder being inert gas, at a temperature from 200° to 540° C., a pressure from atmospheric to 25,000 kPa, and a catalyst contact time from 0.5 to 48 hours.

4. The process of claim 3 wherein said reducing step occurs at a temperature from 200° to 510° C., a pressure from atmospheric to 10,000 kPa, a catalyst contact time of 1 to 24 hours, and said reducing stream consists essentially of at least 70 volume % hydrogen, with the remainder being inert gas.

5. The process of claim 4, further comprising reducing said catalyst, prior to said oxidation step, by contacting said catalyst with a reducing stream consisting essentially of at least 50 volume % hydrogen, with the remainder being inert gas, at a temperature from 200° to 540° C., a pressure from atmospheric to 25,000 kPa, and a catalyst contact time from 0.5 to 48 hours.

6. The process of claim 5, wherein said reducing step prior to said oxidation step occurs at a temperature from 400° to 510° C., a pressure from atmospheric to 10,000 kPa, a catalyst contact time of 1 to 24 hours, and said reducing stream consists essentially of at least 70 volume % hydrogen, with the remainder being inert gas.

7. The process of claim 1, wherein said catalyst comprises about 0.01 to about 5.0 wt % palladium.

8. The process of claim 7, wherein said catalyst comprises about 0.1 to about 1.2 wt % palladium.

9. The process of claim 8, wherein said Zeolite Beta has a silica:alumina ratio of at least 30:1.

10. The process of claim 9, wherein said Zeolite Beta has a silica:alumina ratio of at least 100:1.

11. The process of claim 10, wherein said Zeolite Beta has a silica:alumina ratio of at least 250:1.

12. A cyclic process for dewaxing a hydrocarbon feedstock comprising straight chain paraffins and slightly branched paraffins, comprising the following sequential steps:
    contacting a first stream of said feedstock with a fresh catalyst, comprising a highly dispersed palladium containing crystalline silicate zeolite having the structure of Zeolite Beta under isomerization conditions of temperature, pressure, space velocity and hydrogen feed rate to produce a first effluent stream having a pour point less than that of said feedstock until said fresh catalyst is deactivated;
    oxidizing said deactivated catalyst by contact with an oxidizing stream consisting essentially of an inert gas and oxygen;
    contacting a second stream of said feedstock with said oxidized catalyst at about the same isomerizing conditions of pressure, space velocity and hydrogen feed rate as in said first contacting step, and at a temperature less than 20° F. above that employed in said first contacting step, to produce a second effluent stream having a pour point less than 20° F. above that of said first effluent stream.

13. The process of claim 12, wherein said second effluent stream has a pour point less than 10° F. above that of said first effluent stream.

14. The process of claim 12, wherein said first feedstock stream contacts with said catalyst under isomerizing conditions comprising a temperature from 200° to 540° C., a pressure from atmospheric to 25,000 kPa, a space velocity from 0.1 to 20 LHSV, and a hydrogen feed rate from 1000 to 25,000 SCF/bbl.

15. The process of claim 14, wherein said oxidation step occurs at a temperature from 200° to 540° C., a pressure from atmospheric to 25,000 kPa, for a contact time sufficient to substantially restore said catalyst activity and said oxidizing stream consists essentially of inert gas and 0.1 to 10 volume % oxygen.

16. The process of claim 15, further comprising reducing said oxidized catalyst, prior to said second isomerizing step, by contacting it with a reducing stream consisting essentially of at least 50 volume % hydrogen, with the remainder being inert gas, at a temperature from 200° to 540° C., a pressure from atmospheric to 25,000 kPa, and a catalyst residence time from 0.5 to 48 hours.

17. The process of claim 16, further comprising reducing said catalyst, prior to said oxidation step, by contacting it with a reducing stream consisting essentially of at least 50 volume % hydrogen, with the remainder being inert gas, at a temperature from 200° to 540° C., a pressure from atmospheric to 25,000 kPa, and a catalyst contact time from 0.5 to 48 hours.

18. The process of claim 12, wherein said first feedstock stream is contacted with said catalyst under isomerization conditions comprising a temperature from 400° to 450° C., a pressure from 2000 to 10,000 kPa, a space velocity from 0.2 to 5 LHSV, and a hydrogen feed rate of 2000 to 11,500 SCF/bbl of said first feedstock.

19. The process of claim 18, wherein said oxidation step occurs at a temperature from 350° to 510° C., a pressure from atmospheric to 10,000 kPa, and a catalyst contact time sufficient to oxidize coke to less than 5 wt % of said catalyst and said oxidizing stream consists essentially of inert gas and 0.3 to 7 volume % oxygen.

20. The process of claim 19, further comprising reducing said oxidized catalyst, prior to said second isomerizing step, by contact with a stream consisting essentially of at least 70 volume % hydrogen, with the remainder being inert gas, at a temperature from 200° to 510° C., a pressure from atmospheric to 10,000 kPa, and a catalyst contact time of 1 to 24 hours.

21. The process of claim 20, further comprising reducing said catalyst, prior to said oxidation step, by contact with a stream consisting essentially of at least 70 volume % hydrogen, with the remainder being inert gas, at a temperature from 400° to 510° C., a pressure from atmospheric to 10,000 kPa, and a catalyst contact time of 1 to 24 hours.

22. The process of claim 12 wherein said catalyst comprises about 0.01 to about 5.0 wt % palladium.

23. The process of claim 22, wherein said catalyst comprises about 0.1 to about 1.2 wt % palladium.

24. The process of claim 23, wherein said zeolite has a silica:alumina ratio of at least 30:1.

25. The process of claim 24, wherein said zeolite has a silica:alumina ratio of at least 100:1.

26. The process of claim 25, wherein said zeolite has a silica:alumina ratio of at least 250:1.

27. A cyclic process for dewaxing a hydrocarbon feedstock comprising straight chain paraffins and slightly branched paraffins, consisting essentially of the following sequential steps:

contacting a first stream of said feedstock with a fresh catalyst, comprising about 0.1 to about 1.2 wt % of palladium in highly dispersed form and a crystalline silicate zeolite having the structure of Zeolite Beta, wherein said zeolite has a silica:alumina ratio greater than 30, under isomerization conditions comprising a temperature from 400° to 450° C., a pressure from 2000 to 10,000 kPa, a space velocity from 0.2 to 5 LHSV, and a hydrogen feed rate of 2000 to 11,500 SCF/bbl of said first feedstock to produce an effluent stream having a pour point of less than that of said feedstock until said catalyst is deactivated;

oxidizing said deactivated catalyst by contact with a stream consisting essentially of an inert gas and 0.3 to 7 volume % oxygen at a temperature from 350° to 510° C., a pressure from atmospheric to 10,000 kPa, and a catalyst contact time sufficient to oxidize coke adhering thereto to less than 5 wt % of said catalyst;

reducing said oxidized catalyst by contact with a stream consisting essentially of at least 70 volume % hydrogen, with the remainder being inert gas, at a temperature from 200° to 510° C., a pressure from atmospheric to 10,000 kPa, and a catalyst contact time of 1 to 24 hours; and contacting a second stream of said feedstock with said reduced catalyst under isomerizing conditions comprising a temperature from 400° to 450° C., a pressure from 2000 to 10,000 kPa, a space velocity from 0.2 to 5 LHSV, and a hydrogen feed rate of 2000 to 11,500 SCF/bbl of said second feedstock, and wherein said temperature is less than 20° F. above that employed in said first contacting step, to produce a second effluent stream having a pour point less than 10° F. above that of said first effluent stream.

28. In a process for catalytically dewaxing a hydrocarbon feedstock comprising straight chain paraffins and slightly branched paraffins, said process comprising contacting said feedstock at isomerization conditions with a regenerated catalyst comprising a palladium-containing crystalline-silicate zeolite having the structure of Zeolite Beta to produce an effluent stream having a pour point less than that of said feedstock, wherein said catalyst has been regenerated by an oxidation step comprising contacting said catalyst with an oxidizing stream consisting essentially of inert gas and 0.1 to 10 volume % oxygen, at a temperature between about 200° and about 540° C., and a pressure from atmospheric to 25,000 kPa at a contact time sufficient to substantially restore isomerization activity of said catalyst.

the improvement being that said regenerated catalyst has isomerization activity and comprises palladium in a highly dispersed form.

* * * * *